United States Patent
Satou et al.

(10) Patent No.: US 12,049,262 B2
(45) Date of Patent: Jul. 30, 2024

(54) STEER-BY-WIRE STEERING SYSTEM

(71) Applicants: TOYOTA JIDOSHA KABUSHIKI KAISHA, Toyota (JP); JTEKT Corporation, Kariya (JP)

(72) Inventors: Atsushi Satou, Miyoshi (JP); Yosuke Yamashita, Nagoya (JP); Masaharu Yamashita, Toyota (JP); Toshihiro Takahashi, Nishio (JP); Tokuaki Hibino, Toyota (JP); Yuji Fujita, Okazaki (JP); Yugo Nagashima, Anjo (JP); Kazuma Hasegawa, Aichi-ken (JP); Yuuta Kajisawa, Okazaki (JP); Kenichi Abe, Okazaki (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 163 days.

(21) Appl. No.: 17/852,665

(22) Filed: Jun. 29, 2022

(65) Prior Publication Data
US 2023/0001978 A1    Jan. 5, 2023

(30) Foreign Application Priority Data
Jul. 2, 2021   (JP) .................. 2021-110808

(51) Int. Cl.
*B62D 5/00* (2006.01)
*B60R 16/033* (2006.01)
*B62D 5/04* (2006.01)

(52) U.S. Cl.
CPC ............ *B62D 5/003* (2013.01); *B60R 16/033* (2013.01); *B62D 5/0484* (2013.01)

(58) Field of Classification Search
CPC .... B62D 5/003; B62D 5/0484; B62D 5/0481; B62D 5/04; B60R 16/033
USPC .............................................. 701/41, 42, 43
See application file for complete search history.

(56) References Cited

U.S. PATENT DOCUMENTS

| | | | |
|---|---|---|---|
| 11,377,146 B2 * | 7/2022 | Fujimoto | B62D 5/006 |
| 2020/0247462 A1 | 8/2020 | Akutsu et al. | |
| 2020/0269913 A1 | 8/2020 | Fujimoto | |

FOREIGN PATENT DOCUMENTS

| | | |
|---|---|---|
| JP | 2020-138554 A | 9/2020 |
| WO | 2017/115411 A1 | 7/2017 |

* cited by examiner

*Primary Examiner* — Hai H Huynh
(74) *Attorney, Agent, or Firm* — Sughrue Mion, PLLC

(57) ABSTRACT

A steer-by-wire steering system, including a steering device including a dual-system steering motor including a main system and a sub system, wherein a power supply to the main system is conducted selectively by a main power source and a backup power source, and a power supply to the sub system is conducted by only the main power source, wherein, in a normal power-supply situation in which the power supply to the main system and to the sub system is conducted by the main power source, a controller controls the sub system to operate in accordance with the main system, and wherein, in a backup power-supply situation in which the power supply to the main system is conducted by the backup power source, the controller controls the main system not to operate or to operate while limiting the power supply to the main system and controls the sub system independently.

9 Claims, 7 Drawing Sheets

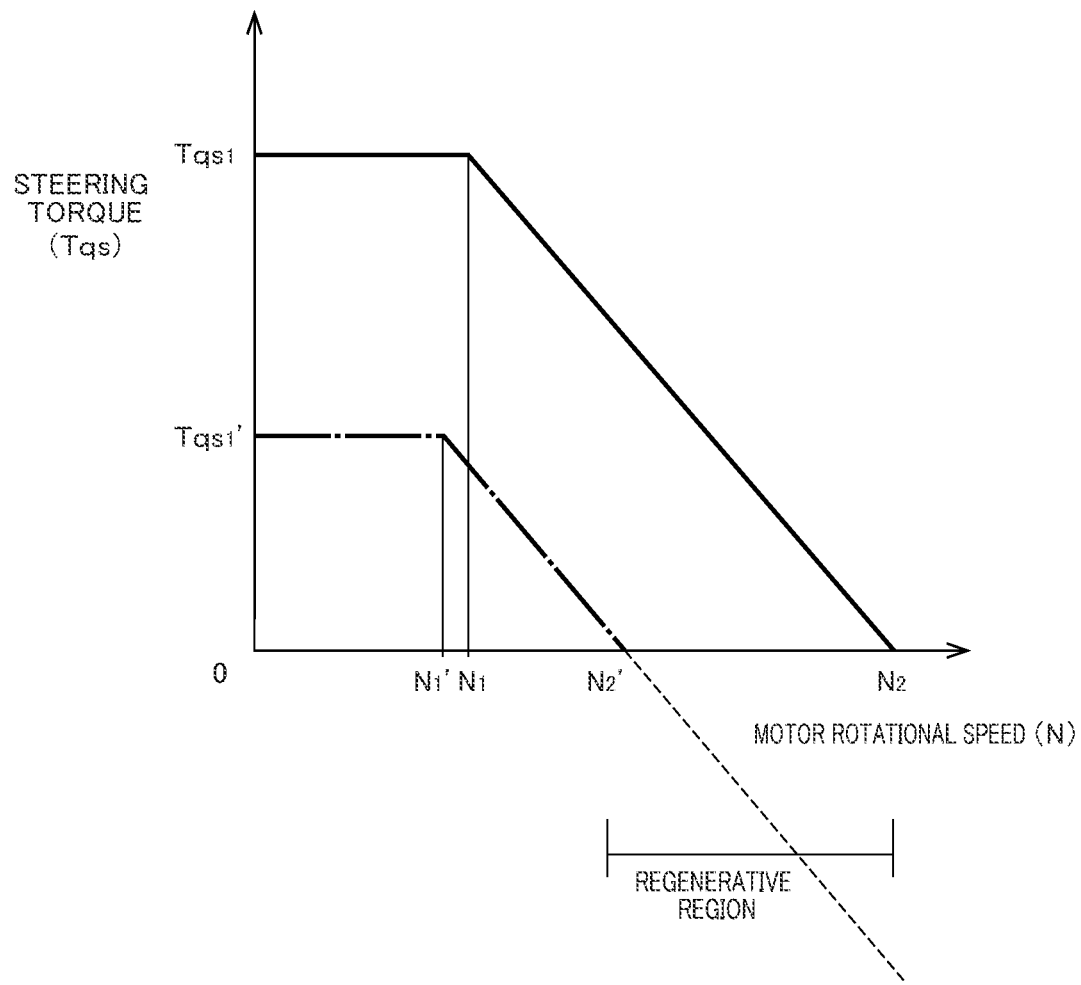

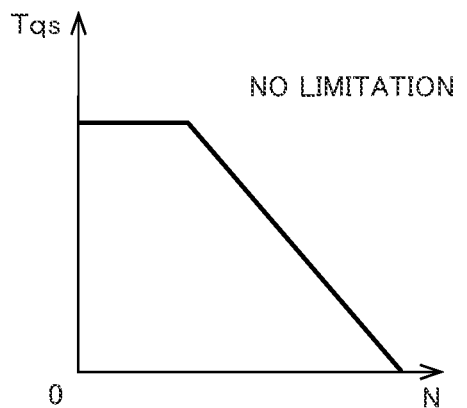
FIG.5A — NO LIMITATION
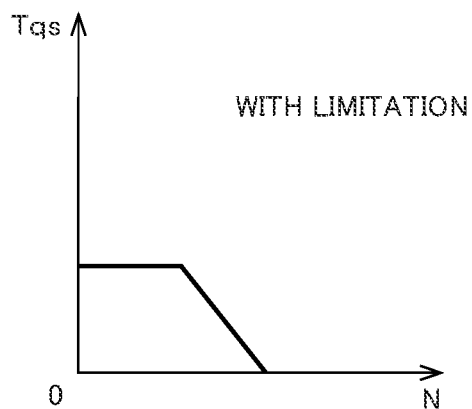
FIG.5B — WITH LIMITATION
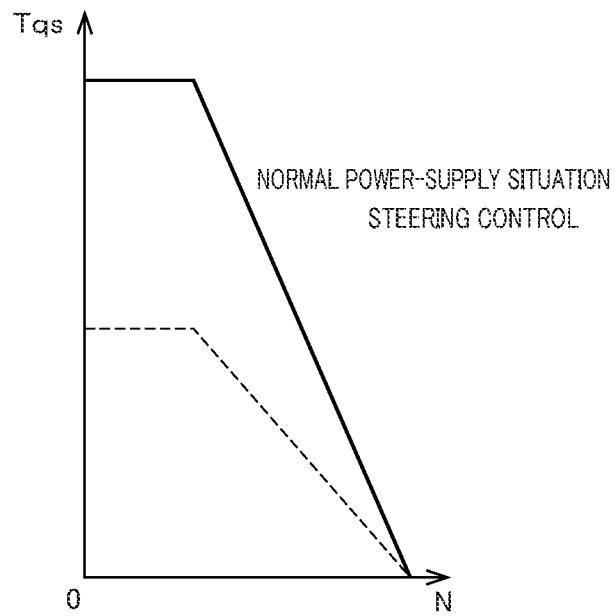
FIG.5C — NORMAL POWER-SUPPLY SITUATION STEERING CONTROL
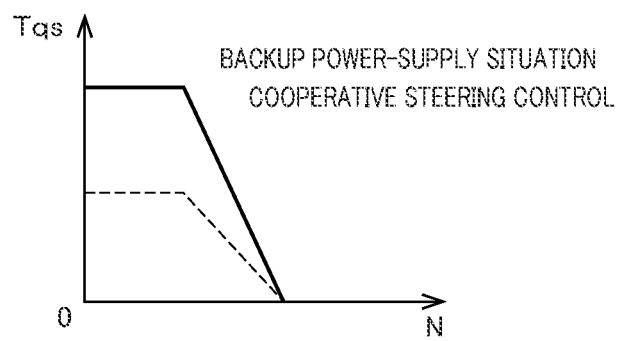
FIG.5D — BACKUP POWER-SUPPLY SITUATION COOPERATIVE STEERING CONTROL
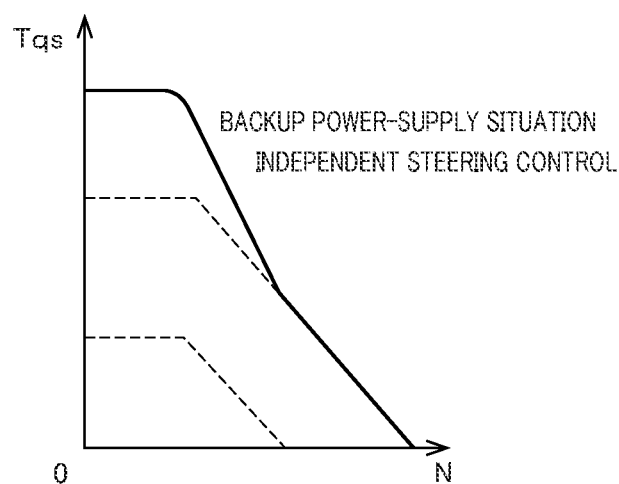
FIG.5E — BACKUP POWER-SUPPLY SITUATION INDEPENDENT STEERING CONTROL

STEER-BY-WIRE STEERING SYSTEM

CROSS REFERENCE TO RELATED APPLICATION

The present application claims priority to Japanese Patent Application No. 2021-110808, which was filed on Jul. 2, 2021, the disclosure of which is herein incorporated by reference in its entirety.

BACKGROUND

Technical Field

The following disclosure relates to a steer-by-wire steering system for vehicles.

Description of Related Art

From the viewpoint of failsafe, it has been proposed to provide a steer-by-wire steering system with a backup power source as described in Patent Document 1 (Japanese Patent Application Publication No. 2020-138554), and it has been proposed to provide the steer-by-wire steering system with redundancy, namely, it has been proposed to duplex the system, as disclosed in Patent Document 2 (WO2017/115411).

SUMMARY

In a case where the steering system employs the backup power source, the utility of the steering system is enhanced by constructing the steering system with consideration given to the fact that the backup power source has a relatively small capacity. In a case where the steering system is duplexed, the utility of the steer-by-wire steering system is enhanced by constructing the steering system with consideration given to a connection configuration of the backup power source in a redundant system. Accordingly, an aspect of the present disclosure is directed to a steer-by-wire steering system with high utility.

In one aspect of the present disclosure, a first steer-by-wire steering system of the present disclosure includes:
 a main power source and a backup power source;
 a steering device including a dual-system steering motor including a main system and a sub system and configured to steer a wheel by a force generated by the steering motor; and
 a controller configured to control the main system and the sub system of the steering motor so as to control the steering device based on a steering request,
 wherein a power supply to the main system of the steering motor is conducted selectively by the main power source and the backup power source, and a power supply to the sub system of the steering motor is conducted by only the main power source,
 wherein, in a normal power-supply situation in which the power supply to the main system of the steering motor and the power supply to the sub system of the steering motor are conducted by the main power source, the controller controls the sub system of the steering motor to operate in accordance with the main system of the steering motor, and
 wherein, in a backup power-supply situation in which the power supply to the main system of the steering motor is conducted by the backup power source, the controller controls the main system of the steering motor not to operate or to operate while limiting the power supply to the main system and the controller controls the sub system of the steering motor independently of the main system.

In another aspect of the present disclosure, a second steer-by-wire steering system according to the present disclosure includes:
 a main power source and a backup power source;
 a steering device including a steering motor and configured to steer a wheel by a force generated by the steering motor; and
 a controller configured to control the steering motor so as to control the steering device based on a steering request,
 wherein the controller limits a current to be supplied to the steering motor when a power supply to the steering motor by the main power source is switched to a power supply to the steering motor by the backup power source.

The backup power source is intended for emergency use, for instance. Thus, the backup power source with a relatively small capacity, i.e., a relatively small charging capacity, is employed in the steering system. In the first steering system according to the present disclosure in which the steering device has redundancy, the backup power source supplies a current to only the main system of the steering motor, instead of the main power source. (The main system of the steering motor will be hereinafter referred to as "steering main system" where appropriate.) In view of the small capacity of the backup power source, the first steering system according to the present disclosure is configured such that, in the backup power-supply situation, i) the power supply to the steering main system is limited or ii) the power supply to the steering main system is not conducted to stop the steering main system from operating in a case where the current is suppliable from the main power source to the sub system of the steering motor. (The sub system of the steering motor will be hereinafter referred to as "steering sub system" where appropriate).

In the first steering system according to the present disclosure, in the normal power-supply situation, namely, in a situation in which the current is supplied from the main power source to both the steering main system and the steering sub system, the steering sub system is operated in accordance with the steering main system for a smooth operation of the steering device. That is, what is called coordinated control is executed. If the coordinated control were executed in the backup power-supply situation, however, the steering sub system would experience limitation to the current supplied thereto or the steering sub system would stop operating, like the steering main system. Thus, the first steering system according to the present disclosure is configured such that, in the backup power-supply situation, the steering sub system is not operated under the coordinated control but is operated independently of the steering main system, namely, the steering sub system is operated in a fashion similar to that in the normal power-supply situation, so as to ensure a force for steering the wheel (hereinafter referred to as "steering force" where appropriate).

The second steering system according to the present disclosure is configured such that the current supplied to the steering motor is limited when the power supply to the steering motor by the main power source is switched to the power supply to the steering motor by the backup power source. With this configuration, the steering system can be operated for a relatively long length of time even by the backup power source with a relatively small capacity.

Various Forms

In the first steering system according to the present disclosure, whether to operate the steering main system with limited power supply in the backup power-supply situation or not to operate the steering main system in the backup power-supply situation may be determined or selected based on a design of the vehicle, a condition in which the vehicle is placed, a state of the power supply to the steering sub system by the main power source, etc. In most situations, in other words, typically, the steering device can generate a larger steering force when the steering main system is operated with limited power supply (i.e., a power-supply-limited operation) than when the steering main system is not operated (i.e., a non-operation). As later described, when the steering motor is rotated at a high speed in the power-supply-limited operation, the steering main system operates in what is called regenerative region, causing a resistance to the steering motion of the wheel. In view of this, the steering main system may be rendered inactive in the backup power-supply situation in a case where the power supply to the steering sub system is appropriately conducted by the main power source.

When the power supply to the steering sub system is not appropriately conducted by the main power source in the backup power-supply situation, it is desirable not to operate the steering sub system. In this instance, it is desirable to operate the steering main system with limited power supply for ensuring the steering force regardless of whether the steering main system is determined to operate with limited power supply or the steering main system is determined not to operate in a case where the power supply to the steering sub system is appropriately conducted by the main power source. In other words, the steering main system may basically operate with limited power supply when the power supply to the steering sub system is not appropriately conducted by the main power source in the backup power-supply situation. In this respect, the steering main system may operate with limited power supply also when the power supply to the steering sub system is appropriately conducted by the main power source. Further, the steering main system may be rendered inactive when the power supply to the steering sub system is appropriately conducted by the main power source. As described above, the operation of the steering main system may be switched between the power-supply-limited operation and the non-operation depending upon whether the operation of the steering main system causes a resistance to the steering motion of the wheel.

As to the coordinated control of the steering main system and the steering sub system, it is desirable to control the operations of the steering main system and the steering sub system such that the steering main system and the steering sub system generate mutually the same force in the normal power-supply situation in a case where the steering main system and the steering sub system are identical in construction.

The controller may be configured to include two systems, i.e., a main system and a sub system, so as to correspond to the main system and the sub system of the steering motor. The main system of the controller (hereinafter referred to as "control main system" where appropriate) and the sub system of the controller (hereinafter referred to as "control sub system" where appropriate) may be configured to have mutually the same function. Specifically, the control main system and the control sub system may be configured to be capable of respectively determining currents to be supplied to the corresponding steering main system and steering sub system based on the steering request and to be capable of controlling the power supply to the corresponding steering main system and steering sub system to be conducted based on the respectively determined currents. In these arrangements, in the normal power-supply situation, the control sub system may control the power supply to the steering sub system by the main power source based on the supply current to the steering main system determined by the control main system, so as to execute the coordinated control. In the backup power-supply situation, the control sub system may determine the supply current to the steering sub system and control the power supply to the steering sub system by the main power source based on the determined supply current without depending on the supply current to the steering main system determined by the control main system.

The main power source may include a storage battery, and the backup power source may be a capacitor. In the normal power-supply situation, the backup power source may be charged with electric energy received from the main power source. In the backup power-supply situation, the power supply to the steering main system by the backup power source may be conducted in dependence on the charged electric energy.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 4 is a graph illustrating a characteristic of a steering motor;

FIG. 5A is a graph illustrating a characteristic of one system of the steering motor in a case where a steering current is not limited;

FIG. 5B is a graph illustrating a characteristic of one system of the steering motor in a case where the steering current is limited;

FIG. 5C is a graph illustrating an overall characteristic of the steering motor in a normal power-supply situation;

FIG. 5D is a graph illustrating an overall characteristic of the steering motor in a case where a coordinated steering control is executed in a backup power-supply situation;

FIG. 5E is a graph illustrating an overall characteristic of the steering motor in a case where an independent steering control is executed in the backup power-supply situation;

DETAILED DESCRIPTION OF THE EMBODIMENT

Figure 1:
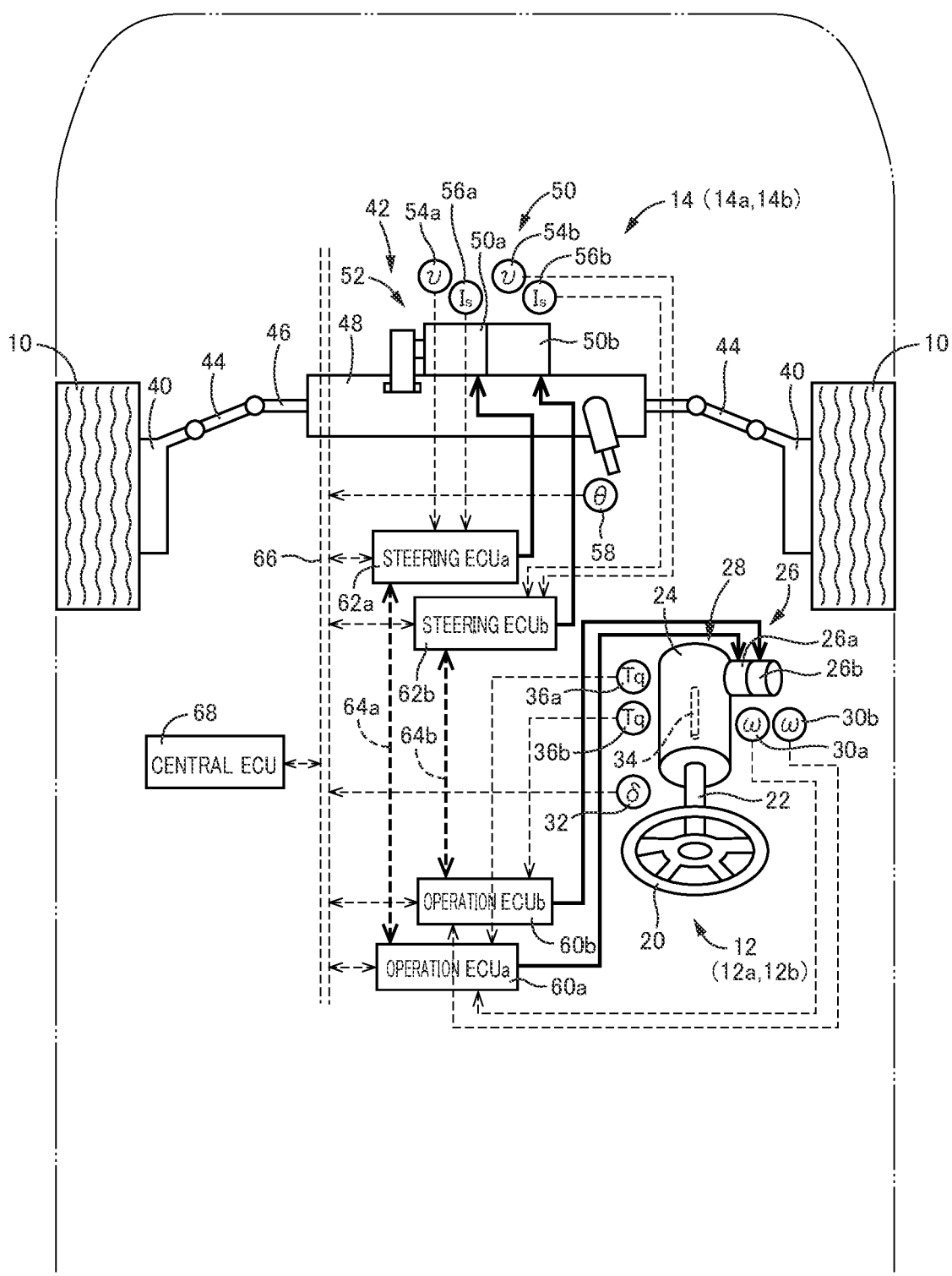
FIG. 1 is a view schematically illustrating an overall configuration of a steering system according to one embodiment of the present disclosure.

Referring to the drawings, there will be described below in detail a steering system according to one embodiment of the present disclosure. It is to be understood that the present disclosure is not limited to the details of the following embodiment but may be embodied based on the forms described in Various Forms and may be changed and modified based on the knowledge of those skilled in the art.

A. Configuration of Steering System

As schematically illustrated in FIG. 1, a steering system according to one embodiment of the present disclosure is installed on a vehicle for steering two wheels 10, i.e., front wheels 10, each as a steerable wheel. The present steering system is a steer-by-wire steering system including an operation device 12 and a steering device 14, which are mechanically independent of each other.

The operation device 12 includes: a) a steering wheel 20 (as one example of an operating member) operable by a driver to steer the wheels 10; b) a steering shaft 22 to one end of which is attached the steering wheel 20; c) a steering column 24 rotatably holding the steering shaft 22 and supported by an instrument panel reinforcement (not illustrated); and d) a reaction force applying mechanism 28 configured to apply, to the steering wheel 20 via the steering shaft 22, a reaction force (a counterforce) $F_{CT}$ against a steering operation of the steering wheel 20 by utilizing, as a force generation source, a reaction force motor 26 supported by the steering column 24. The reaction force motor 26 is an electric motor. Though the reaction force is a reaction force torque in a strict sense, a commonly used term "operation reaction force" will be hereinafter used. The reaction force applying mechanism 28 has an ordinary configuration including a speed reducer, etc., and a detailed description of the reaction force applying mechanism 28 is dispensed with.

The reaction force motor 26 is a three-phase brushless DC motor. Magnets are fixed to an outer circumference of a rotational shaft of the reaction force motor 26, and coils are provided on the motor housing so as to be opposed to the magnets. The reaction force motor 26 is a dual-system motor in which two sets of coils are provided for one magnet. Hereinafter, the two systems of the reaction force motor 26 will be respectively referred to as "reaction force motor 26a" and "reaction force motor 26b" where appropriate. The reaction force motors 26a, 26b respectively include motor rotation angle sensors 30a, 30b each for detecting a rotation angle w for phase switching in power supply to the corresponding reaction force motor 26a, 26b. The rotation angle in one rotation may be considered as "relative angle" or "phase". Hereinafter, a term "motor rotation angle sensor 30" is used as a general term for the motor rotation angle sensors 30a, 30b where appropriate. In the present embodiment, the operation device 12 is a redundant system including two systems, i.e., an operation device 12a and an operation device 12b.

The operation device 12 includes an operation angle sensor 32 for detecting an operation angle δ of the steering wheel 20 as a steering operation amount. Here, a posture of the steering wheel 20 in a straight traveling state of the vehicle is defined as a neutral posture. In this case, a rotation angle from the neutral posture in a rightward direction or a leftward direction (that may be considered as an absolute angle) is the operation angle δ of the steering wheel 20.

In the present steering system, a torsion bar 34 is incorporated in the steering shaft 22, as in typical power steering systems. The present steering system includes operation torque sensors 36a, 36b for detecting an operation torque Tqo, which is an operation force applied to the steering wheel 20 by the driver, based on a torsional amount of the torsion bar 34. Hereinafter, a term "operation torque sensor 36" is used as a general term for the operation torque sensors 36a, 36b where appropriate. The two operation torque sensors 36a, 36b are provided so as to correspond to the two systems of the operation device 12.

The wheels 10 are supported by a body of the vehicle via respective steering knuckles 40 such that the wheels 10 are turnable or steerable. The steering knuckles 40 are constituent elements of respective suspension devices. The steering device 14 rotates the steering knuckles 40 to thereby steer the wheels 10 together. The steering device 14 includes a steering actuator 42 as a main constituent element. The steering actuator 42 includes: a) a steering rod (that may also be referred to as "rack bar") 46 whose opposite ends are coupled to the right and left steering knuckles 40 via respective link rods 44; b) a housing 48 fixedly supported by the vehicle body and supporting the steering rod 46 movably in the right-left direction; and c) a rod moving mechanism 52 configured to move the steering rod 46 in the right-left direction utilizing a steering motor 50 as a drive source. The steering motor 50 is an electric motor. The rod moving mechanism 52 is constituted principally by a ball screw mechanism including a ball groove formed in the steering rod 46 and a nut that is in engagement with the ball groove via bearing balls and that is rotated by the steering motor 50. The rod moving mechanism 52 has an ordinary configuration, and a detailed description of the rod moving mechanism 52 is dispensed with.

Like the reaction force motor 26, the steering motor 50 is a dual-system, three-phase brushless DC motor including two systems, i.e., a steering motor 50a and a steering motor 50b. The steering motors 50a, 50b respectively include motor rotation angle sensors 54a, 54b each for detecting a rotation angle ν in one rotation for phase switching in power supply to the corresponding steering motor 50a, 50b. The rotation angle in one rotation may be considered as "relative angle" or "phase". Hereinafter, a term "motor rotation angle sensor 54" is used as a general term for the motor rotation angle sensors 54a, 54b where appropriate. In the present embodiment, the steering device 14 is a redundant system including two systems, i.e., a steering device 14a and a steering device 14b. The steering motors 50a, 50b respectively include current sensors 56a, 56b each for detecting a current $I_S$ actually supplied to the corresponding steering motor 50a, 50b. Hereinafter, a term "current sensor 56" is used as a general term for the current sensors 56a, 56b where appropriate.

The steering device 14 includes a steering angle sensor 58 for detecting an amount of movement of the steering rod 46 in a rightward direction or a leftward direction from its neutral position (that is a position of the steering rod 46 in the straight traveling state of the vehicle) to thereby detect a steering angle θ, which is a steering amount of the wheels 10.

Control of the operation device 12, specifically, control of the operation reaction force $F_{CT}$, namely, control of the reaction force motor 26 of the operation device 12, is executed by operation electronic control units 60a, 60b that correspond to the respective two systems of the operation device 12. Each operation electronic control unit (that will be hereinafter referred to as "operation ECU") 60a, 60b is an operation controller for a corresponding one of the two systems of the operation device 12. Hereinafter, a term "operation ECU 60" is used as a general term for the operation ECUs 60a, 60b where appropriate. The operation ECU 60 is constituted by a computer including a CPU, a ROM, a RAM, etc., and an inverter that is a driver (drive circuit) for the reaction force motor 26.

Similarly, control of the steering device 14, specifically, control of the steering angle θ, namely, control of the steering motor 50 of the steering device 14, is executed by steering electronic control units 62a, 62b that correspond to the respective two systems of the steering device 14. Each steering electronic control unit (that will be hereinafter referred to as "steering ECU") 62a, 62b is a steering controller for a corresponding one of the two systems of the steering device 14. Hereinafter, a term "steering ECU 62" is used as a general term for the steering ECUs 62a, 62b where appropriate. The steering ECU 62 is constituted by a computer including a CPU, a ROM, a RAM, etc., and an inverter that is a driver (drive circuit) for the steering motor 50.

In the present embodiment, the operation device 12a, the steering device 14a, the operation ECU 60a, and the steering ECU 62a constitute one system while the operation device 12b, the steering device 14b, the operation ECU 60b, and the steering ECU 62b constitute another system, so that the present steering system is a dual-system steering system. In this configuration, the operation device 12a and the steering device 14a are connected by a dedicated communication line 64a while the operation device 12b and the steering device 14b are connected by a dedicated communication line 64b. (Hereinafter, a term "dedicated communication line 64" is used as a general term for the dedicated communication lines 64a, 64b where appropriate.) For enabling communication between the operation device 12 and the steering device 14 in mutually different systems, the operation devices 12 and the steering devices 14 are connected to a CAN (car area network or controllable area network) 66, which is a common communication line.

As described later in detail, the present steering system includes a central electronic control unit (hereinafter referred to as "central ECU" where appropriate) 68 responsible for overall control of the two systems of the steering system. The central ECU 68 is one example of a central controller. The central ECU 68 includes a computer as a main constituent element. The central ECU 68 is also connected to the CAN 66. It may be considered that the two operation ECUs 60a, 60b, the two steering ECUs 62a, 62b, and the central ECU 68 constitute one controller in the present steering system.

In the present steering system, the operation device 12a, the steering device 14a, the operation ECU 60a, and the steering ECU 62a constitute a main system while the operation device 12b, the steering device 14b, and the operation ECU 60b, and the steering ECU 62b constitute a sub system. The steering device 14a and the steering motor 50a may be respectively considered as a steering main system 14a and a steering main system 50a, and the steering device 14b and the steering motor 50b may be respectively considered as a steering sub system 14b and a steering sub system 50b. Likewise, the operation device 12a and the reaction force motor 26a may be respectively considered as an operation main system 12a and a reaction force main system 26a, and the operation device 12b and the reaction force motor 26b may be respectively considered as an operation sub system 12b and a reaction force sub system 26b. Further, the operation ECU 60a and the steering ECU 62a may be respectively considered as a control main system 60a and a control main system 62a, and the operation ECU 60b and the steering ECU 62b may be respectively considered as a control sub system 60b and a control sub system 62b.

B. Power Sources in Steering System

Figure 2:
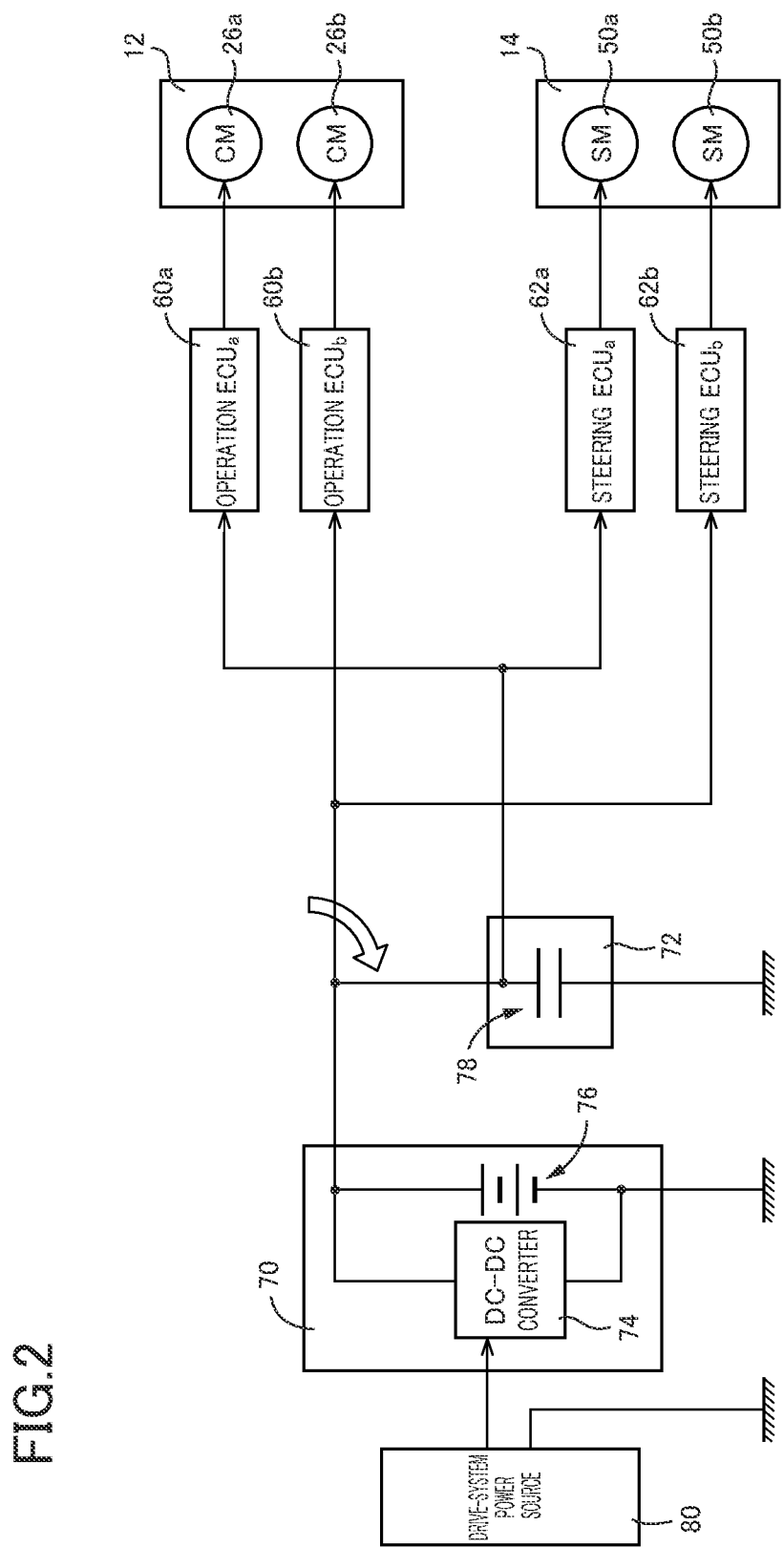
FIG. 2 is a schematic view illustrating a layout of power sources in the steering system.

As power sources for the operation device 12 and the steering device 14, the steering system according to the present embodiment includes: a main power source unit 70, which is a main power source; and a backup power source unit 72, which is a backup power source, as schematically illustrated in FIG. 2. (Hereinafter, the main power source unit 70 and the backup power source unit 72 will be simply referred to as "main power source 70" and "backup power source 72", respectively.) The main power source 70 includes a DC-DC converter 74 and a storage battery 76. The backup power source 72 includes a capacitor 78. In FIG. 2, ground lines from the operation device 12 and the steering device 14 are not illustrated.

The vehicle on which the present steering system is installed is a hybrid electric vehicle (HEV). Electric power is supplied to the DC-DC converter 74 from a drive-system power source 80. The DC-DC converter 74 converts a voltage applied from the drive-system power source 80 into a drive voltage for the steering system. The storage battery 76 is connected to the DC-DC converter 74 so as to be in parallel with each other. The storage battery 76 stores electric energy at the voltage converted by the DC-DC converter 74. In a case where the vehicle on which the present steering system is installed is neither hybrid electric vehicles (HEV) nor battery electric vehicles (BEV), the electric power may be supplied not from the drive-system power source 80 but from an alternator, for instance, or the main power source 70 may be configured to include the alternator.

The electric power is supplied from the main power source 70 to the reaction force motor 26b constituting the operation sub system 12b and the steering motor 50b constituting the steering sub system 14b respectively via the operation ECU 60b and the steering ECU 62b, specifically, via the inverters of the operation ECU 60b and the steering ECU 62b. The electric power is supplied from the backup power source 72 to the reaction force motor 26a constituting the operation main system 12a and the steering motor 50a constituting the steering main system 14a respectively via the operation ECU 60a and the steering ECU 62a, specifically, via the inverters of the operation ECU 60a and the steering ECU 62a.

The backup power source 72 receives the electric power from the main power source 70, and the capacitor 78 of the backup power source 72 is charged with the received electric power. The backup power source 72 allows the electric power received from the main power source 70 to pass therethrough while the capacitor 78 is charged, so as to allow the power supply from the main power source 70 to the reaction force motor 26a and to the steering motor 50a. Thus, in a normal power-supply situation in which normal power supply is conducted, the electric power is supplied from the main power source 70 to both of: the reaction force motor 26a and the steering motor 50a respectively constituting the operation main system 12a and the steering main system 14a; and the reaction force motor 26b and the steering motor 50b respectively constituting the operation sub system 12b and the steering sub system 14b. Hereinafter, the power supply from the main power source 70 via the backup power source 72 will be simply referred to as "power supply from the main power source 70" or "power supply by the main power source 70".

A case is considered in which connection between the main power source 70 and the backup power source 72 is cut at a position indicated by the white arrow in FIG. 2. In this case, the main power source 70 cannot supply the electric power to the reaction force motor 26a and the steering motor 50a. Accordingly, the backup power source 72 supplies the electric power to the reaction force motor 26a and the steering motor 50*a* in dependence on the electric energy stored in the capacitor 78. That is, the backup power source 72 has a function of switching the power supply source from which the electric power is supplied to the reaction force motor 26*a* and the steering motor 50*a*. Specifically, the backup power source 72 supplies the electric power from the capacitor 78 in a case where the electric power is not supplied to the backup power source 72 from the main power source 70 at an appropriate voltage. Hereinafter, the power supply from the capacitor 78 will be referred to as "power supply from the backup power source 72" or "power supply by the backup power source 72".

In other words, the present steering system is configured such that the electric power is supplied to the reaction force motor 26*b* constituting the operation sub system 12*b* and the steering motor 50*b* constituting the steering sub system 14*b* only from the main power source 70 and such that the electric power is supplied to the reaction force motor 26*a* constituting the operation main system 12*a* and the steering motor 50*a* constituting the steering main system 14*a* selectively from the main power source 70 and the backup power source 72. In the backup power-supply situation, the power supply source from which the electric power is supplied to the reaction force motor 26*a* and the steering motor 50*a* is switched from the main power source 70 to the backup power source 72, so that the power supply to the reaction force motor 26*a* and the steering motor 50*a* is conducted by the backup power source 72.

The main power source 70 includes the storage battery 76 whereas the backup power source 72 merely includes the capacitor 78. Thus, the capacity (charging capacity) of the backup power source 72 is considerably smaller than the capacity of the storage battery 76. In view of this, the backup power source 72 of the present steering system is configured to supply the electric power to only one of the two systems of the operation device 12 and only one of the two systems of the steering device 14, specifically, the backup power source 72 is configured to supply the electric power only to the operation main system 12*a* and the steering main system 14*a*.

C. Control of Steering System

Hereinafter, there will be described the control of the present steering system, namely, there will be described in order a steering control for the steering device 14 and a reaction force control for the reaction force applying mechanism 28 of the operation device 12.

(a) Steering Control

The steering control is for steering the wheels 10 in accordance with a steering request, namely, in accordance with the operation angle δ of the steering wheel 20 in manual driving. The steering control is executed by the steering ECU 62. As the steering control, two sorts of controls are set in the present steering system, i.e., an independent steering control (hereinafter simply referred to as "independent control" where appropriate) executed by the dual-system controller, namely, executed by the steering ECU 62*a* and the steering ECU 62*b* independently of each other and a coordinated steering control (hereinafter simply referred to as "coordinated control" where appropriate) executed in a coordinated fashion by the steering ECU 62*a* and the steering ECU 62*b*. The independent steering control and the coordinated steering control will be first described, and the steering control in the backup power-supply situation and a flow of switching the controls will be then described.

i) Independent Steering Control

In the independent steering control, the steering ECU 62*a* constituting the control main system controls the steering main system 14*a*, and the steering ECU 62*b* constituting the control sub system controls the steering sub system 14*b*. That is, the steering ECU 62*a* and the steering ECU 62*b* execute the same control in parallel with each other. Hereinafter, the steering control executed by the steering ECU 62*a* and the steering control executed by the steering ECU 62*b* will be described as the steering control executed by one system. In the following description of the independent steering control, the suffixes a, b used with the constituent elements will be omitted when it is not necessary to distinguish the main system and the sub system from each other.

The motor rotation angle ω of the reaction force motor 26 and the operation angle δ of the steering wheel 20 have a relation to satisfy a predetermined gear ratio. At startup of the vehicle, calibration of the motor rotation angle ω is carried out based on the operation angle δ detected by the operation angle sensor 32. The operation ECU 60 obtains the operation angle δ of the steering wheel 20 based on the motor rotation angle ω detected via the motor rotation angle sensor 30 of the reaction force motor 26. In the independent steering control, the steering ECU 62 receives information on the operation angle δ from the operation ECU 60 in the same system. The steering ECU 62 determines a target steering angle θ*, which is a target of the steering angle θ of the wheels 10, by multiplying the received operation angle δ by a steering gear ratio $R_G$, according to the following expression:

$$\theta^* = R_G \times \delta$$

The steering angle θ of the wheels 10 and the motor rotation angle ν of the steering motor 50 have a relation to satisfy a predetermined gear ratio, and the control for the steering angle θ of the wheels 10 is executed utilizing the motor rotation angle ν in place of the steering angle θ. Thus, the steering ECU 62 determines a target motor rotation angle ν*, which is a target of the motor rotation angle ν of the steering motor 50, based on the determined target steering angle θ*. In this respect, at startup of the vehicle, calibration of the motor rotation angle ν is carried out based on the steering angle θ detected via the steering angle sensor 58.

The steering ECU 62 detects an actual motor rotation angle ν of the steering motor 50 via the motor rotation angle sensor 54 and determines a motor rotation angle deviation Δν, which is a deviation of the motor rotation angle ν with respect to the target motor rotation angle ν*, according to the following expression:

$$\Delta\nu = \nu^* - \nu$$

Here, the torque generated by the steering motor 50 is referred to as a steering torque $Tq_S$. The steering ECU 62 determines the steering torque $Tq_S$ to be generated according to a feedback control law based on the motor rotation angle deviation Δν, namely, according to the following expression. In the following expression, the first term, the second term, and the third term are a proportional term, an integral term, and a derivative term, respectively, and "$G_P$", "$G_I$", and "$G_D$" are a proportional term gain, an integral term gain, and a derivative term gain, respectively.

$$Tq_S = G_P \times \Delta\nu + G_I \times \int \Delta\nu \, dt + G_D \times d\Delta\nu/dt$$

Here, the current supplied to the steering motor 50 is referred to as a steering current $I_S$. The steering torque $Tq_S$ and the steering current $I_S$ are generally proportional to each other. According to the relationship, the steering ECU 62 determines the steering current $I_S$ to be supplied to the steering motor 50 based on the determined steering torque $Tq_S$ and supplies the steering current $I_S$ to the steering motor 50. As later described in detail, the value of the steering current $I_S$ is utilized in the control for the reaction force applying mechanism 28 of the operation device 12 and in the coordinated steering control. Accordingly, the steering ECU 62 transmits information on the steering current $I_S$.

Figure 3:
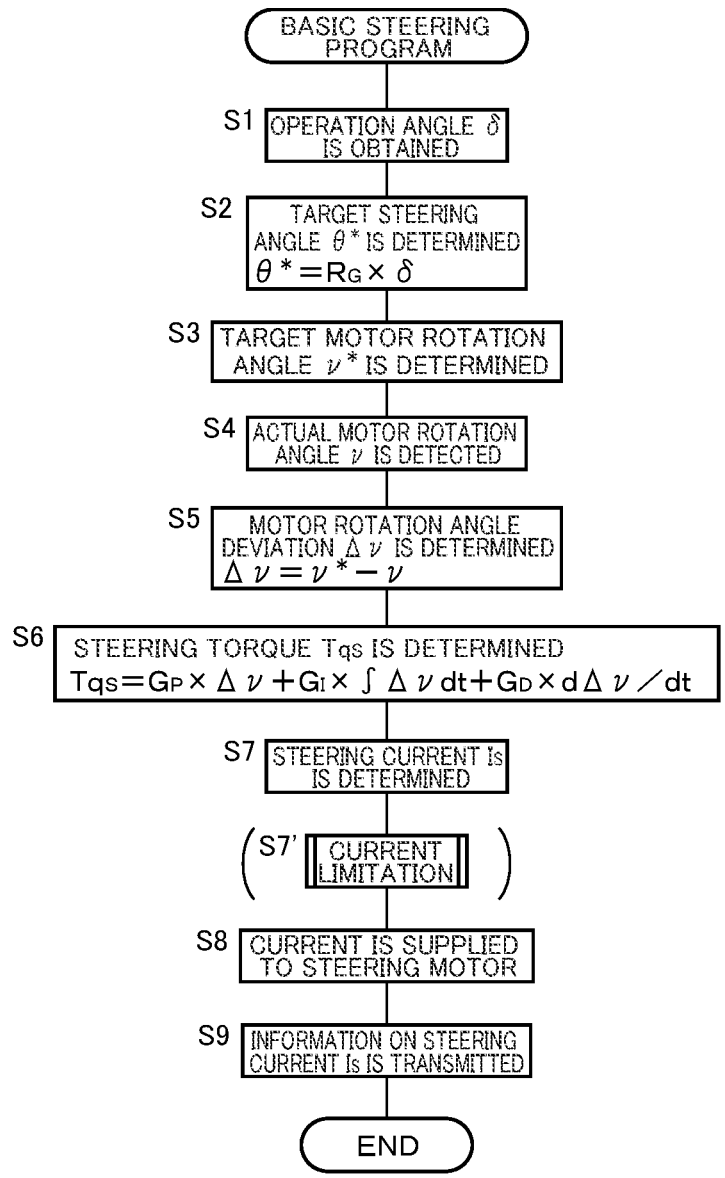
FIG. 3 illustrates a flowchart of a basic steering program and a flowchart of a dependent steering program executed in the steering system according to the embodiment.

Each of the steering ECU 62a and the steering ECU 62b repeatedly executes a basic steering program represented by a flowchart of FIG. 3 at a short time pitch of from several to several tens of milliseconds, for instance, so that the independent steering control is executed. There will be hereinafter briefly described a process according to the program. The process executed by each of the steering ECU 62a and the steering ECU 62b according to the basic steering program will be hereinafter referred to as "basic steering process" where appropriate.

In the basic steering process, the control flow starts with S1 at which the operation angle δ of the steering wheel 20 is obtained from the operation ECU 60. At S2, the target steering angle θ* is determined. At S3, the target motor rotation angle ν* is determined. At S4, the actual motor rotation angle ν is detected. At S5, the motor rotation angle deviation Δν is determined. At S6, the steering torque $Tq_S$ is determined based on the motor rotation angle deviation Δν. At S7, the steering current $I_S$, which is the supply current to the steering motor 50, is determined based on the steering torque $Tq_S$. At S8, the steering current $I_S$ is supplied to the steering motor 50. The information on the steering current $I_S$ is transmitted at S9.

ii) Coordinated Steering Control

The independent steering control has been described above. In the normal power-supply situation in which the electric power is suppliable from the main power source 70 to both the steering main system 14a and the steering sub system 14b, the coordinated steering control is executed. The coordinated steering control is for ensuring a smooth operation of the steering device 14, specifically, a smooth operation of the steering actuator 42, and for causing the steering main system 14a and the steering sub system 14b to generate mutually the same force. In other words, the coordinated steering control is for causing the steering motor 50b constituting the steering sub system 14b to operate in accordance with the steering motor 50a constituting the steering main system 14a.

In the independent steering control described above, the steering ECU 62a constituting the control main system transmits, to the steering ECU 62b constituting the control sub system, the information on the steering current $I_S$ that the steering ECU 62a itself supplies to the steering motor 50a. The steering ECU 62b does not determine the steering current $I_S$ that the steering ECU 62b itself supplies to the steering motor 50b, but supplies, to the steering motor 50b, the steering current $I_S$ based on the received information.

The steering ECU 62b repeatedly executes a dependent steering program represented by a flowchart of FIG. 3, in place of the basic steering program, at a short time pitch of from several to several tens of milliseconds, for instance. In a process according to the program, the control flow starts with S11 at which the steering ECU 62b receives, from the steering ECU 62a, the steering current $I_S$ that the steering ECU 62b itself should supply. At S12, the steering current $I_S$ is supplied to the steering motor 50b. At S13, the information on the steering current $I_S$ is transmitted. The process executed by the steering ECU 62b according to the dependent steering program will be hereinafter referred to as "dependent steering process" where appropriate.

iii) Steering Control in Backup Power-Supply Situation

As described above, the backup power source 72 includes the capacitor 78, and the capacity of the backup power source 72 is considerably smaller than that of the main power source 70. In the present steering system, when the steering main system 14a is operated by the electric power received from the backup power source 72 in place of the main power source 70, the steering current $I_S$ to be supplied to the steering motor 50a of the steering main system 14a is limited.

In a case where the steering current $I_S$ is not limited, the steering motor 50a and the steering motor 50b have a characteristic of the torque with respect to the rotational speed (hereinafter referred to as "N-T characteristic") schematically indicated by the solid line in the graph of FIG. 4. The output of each of the steering motor 50a and the steering motor 50b has a ceiling. Accordingly, the steering torque $Tq_S$ is kept constant at $Tq_{S1}$ until the motor rotational speed (i.e., the number of rotations per unit time) N becomes equal to $N_1$. With an increase in the rotational speed N beyond $N_1$, the steering torque $Tq_S$ linearly decreases and subsequently becomes equal to 0 when the rotational speed N becomes equal to $N_2$.

Though not described in detail, the steering current $I_S$ is limited in the present steering system such that a guard is provided, in other words, an upper limit is set, for a maximum supply current while a duty ratio in a PWM (pulse width modulation) operation of the inverter of the steering ECU 62 is kept lower than that in the normal power-supply situation. Accordingly, the steering motor 50a and the steering motor 50b have an N-T characteristic indicated by the long dashed short dashed line in the graph of FIG. 4. Specifically, the steering torque $Tq_S$ is kept constant at $Tq_{S1}'$ ($<Tq_{S1}$) until the rotational speed N becomes equal to $N_1'$. With an increase in the rotational speed N beyond $N_1'$, the steering torque $Tq_S$ linearly decreases and subsequently becomes equal to 0 when the rotational speed N becomes equal to $N_2'$ ($<N_2$). By thus limiting the steering current $I_S$, the backup power source 72 even with a small capacity enables the power supply to the steering motor 50a for a relatively long length of time.

The process which executes by the steering ECU 62a and which involves the limitation of the steering current $I_S$ described above will be referred to as "current-limited steering process". In the current-limited steering process, after determination of the steering current $I_S$ at S7 in the basic steering program represented by the flowchart of FIG. 3, S7' (enclosed in brackets in the flowchart) is implemented to limit the steering current $I_S$ as described above before the current is supplied to the steering motor 50a at S8. Subsequently, at S8, the current is supplied to the steering motor 50a based on the limited steering current $I_S$.

The overall characteristic of the steering motor 50 may be considered as a composite of the characteristic of the steering motor 50a and the characteristic of the steering motor 50b. The N-T characteristic of each of the steering motor 50a and the steering motor 50b when the steering current $I_S$ is not limited is indicated by the graph of FIG. 5A while the N-T characteristic thereof when the steering current $I_S$ is limited is indicated by the graph of FIG. 5B. The overall characteristic of the steering motor 50 in the normal power-supply situation is illustrated in the graph of FIG. 5C. In contrast, when the coordinated steering control is executed while limiting the steering current $I_S$ to the steering motor 50a, the N-T characteristic of the steering motor 50b is similar to that of the steering motor 50a when the steering current $I_S$ is limited. In this case, the overall characteristic of the steering motor 50 is considerably low as indicated by the graph of FIG. 5D. In other words, it is impossible to obtain the steering torque $Tq_S$ sufficiently.

In view of this, the present steering system executes the independent steering control in the backup power-supply situation to operate the steering main system 14a according to the current-limited steering process, namely, to cause the steering man system 14a to be operated with limited power supply, and to operate the steering sub system 14b according to the basic steering process. The thus operated steering main system 14a and steering sub system 14b enable the overall characteristic of the steering motor 50 to be kept relatively high as indicated by the graph of FIG. 5E. In this respect, a mode in which the steering main system 14a is operated according to the current-limited steering process and the steering sub system 14b is operated according to the basic steering process will be hereinafter referred to as "limit operation mode".

As described above, the characteristic of the steering motor 50a according to the current-limited steering process is indicated by the long dashed short dashed line in FIG. 4. In the limit operation mode, the steering main system 14a operates in the regenerative region as indicated by the dashed line when the rotational speed N of the steering motor 50 exceeds $N_2'$. In the operation in this region, the torque generated by the steering motor 50a is opposite in direction to the steering torque Tqs generated by the steering motor 50b, thus canceling the steering torque $Tq_S$ generated by the steering motor 50b. This may lead to a reduction in the overall characteristic of the steering motor 50 in the limit operation mode.

To obviate a reduction in the overall characteristic of the steering motor 50 in the limit operation mode, there is set, in the present steering system, another mode different from the limit operation mode, namely, a non-operation mode is set in which the steering main system 14a is not operated and the steering sub system 14b is operated according to the basic steering process. In the non-operation mode, the steering torque is generated by only the steering sub system 14b, so that the steering motor 50 assumes the overall characteristic indicated by the graph of FIG. 5A. Even such an overall characteristic provides a higher characteristic than that indicated by the graph of FIG. 5D obtained when the coordinated steering control is executed in the backup power-supply situation while causing the steering main system 14a to be operated with limited power supply.

In the regenerative region, the rotational speed N of the steering motor 50 is higher than $N_2'$. In view of this, there is set, in the present steering system, still another mode in which the steering device 14 is operated in the limit operation mode when the rotational speed N of the steering motor 50 is not higher than $N_2'$ and is operated in the non-operation mode when the rotational speed N of the steering motor 50 is higher than $N_2'$. In other words, there is set a switch mode in which the operation mode of the steering device 14 is switched depending upon the rotational speed N.

The selection of the operation mode, namely, the determination as to which one of the limit operation mode, the non-operation mode, and the switch mode is set, may be made depending on the type of the vehicle or may be made at production facilities of the vehicle, dealers, etc. Alternatively, the driver of the vehicle may set any one of the operation modes described above.

Figure 6:
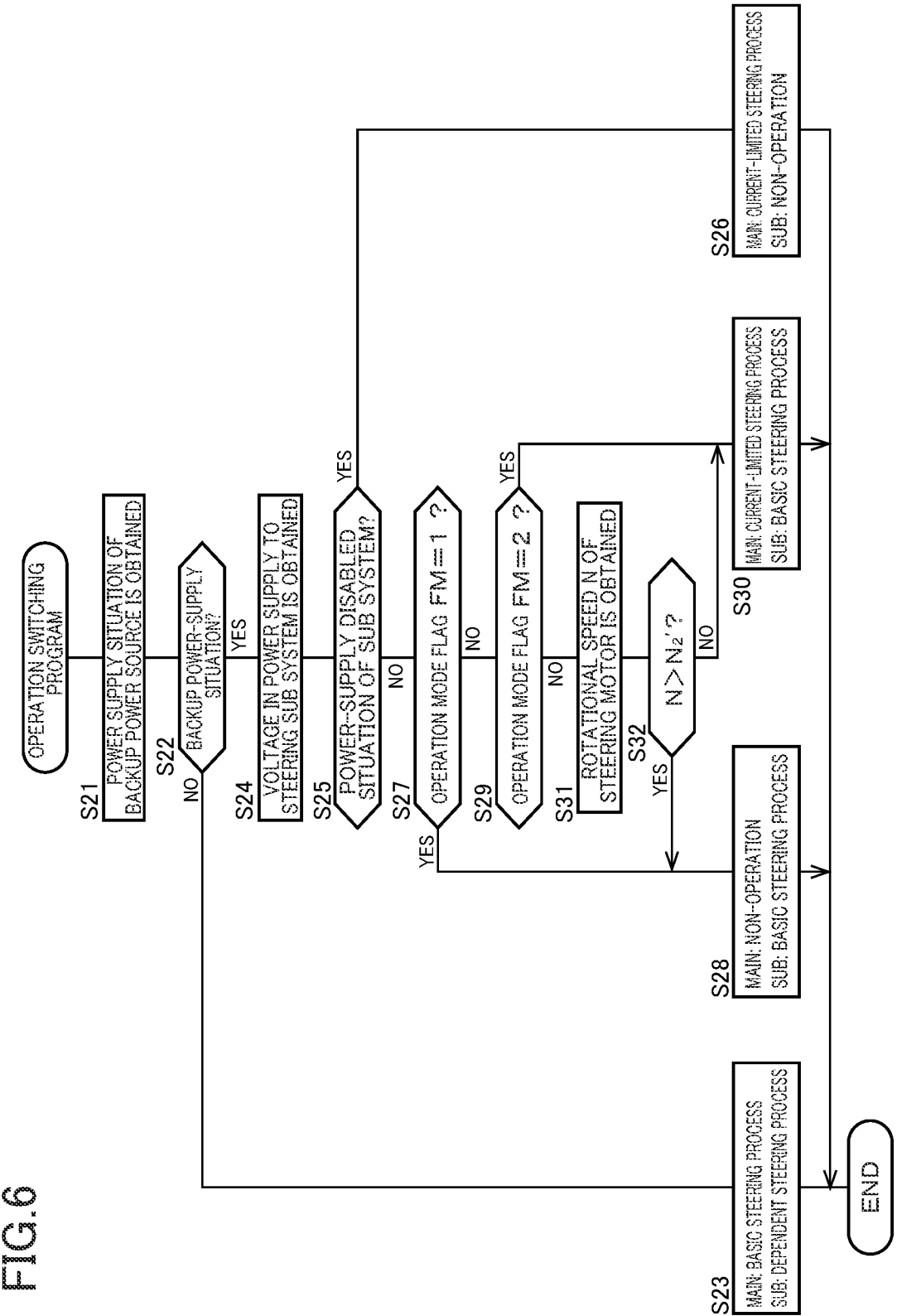
FIG. 6 is a flowchart of an operation switching program executed in the steering system according to the embodiment.

In case of a malfunction of the main power source 70, for instance, it is anticipated that the power supply to the steering sub system 14b is not appropriately conducted in the backup power-supply situation. Such a situation will be referred to as "power-supply disabled situation of the sub system" where appropriate. In the power-supply disabled situation of the sub system, the steering main system 14a is operated with limited power supply without operating the steering sub system 14b. Specifically, irrespective of which one of the limit operation mode, the non-operation mode, and the switch mode is employed, the steering main system 14a is operated with limited power supply in the power-supply disabled situation of the sub system. Thus, even in the power-supply disabled situation of the sub system, the characteristic illustrated in the graph of FIG. 5B is ensured as the overall characteristic of the steering motor 50 though the characteristic is relatively low.

iv) Flow of Switching of Operations of Steering Main System and Steering Sub System The central ECU 68 makes instructions as to switching of respective operations of the steering main system 14a and the steering sub system 14b, namely, the central ECU 68 makes instructions as to the respective operations that should be performed by the steering main system 14a and the steering sub system 14b in each of the normal power-supply situation and the backup power-supply situation. For switching the operations, the central ECU 68 repeatedly executes an operation switching program represented by a flowchart of FIG. 6 at a short time pitch of from several to several tens of milliseconds, for instance. There will be hereinafter described a process according to the program.

In the process according to the operation switching program, S21 is initially implemented to obtain, from the backup power source 72, information on the power supply situation of the backup power source 72, namely, information as to whether the power supply to the steering main system 14a can be conducted by the main power source 70. Though not described in detail, the backup power source 72 is also connected to the CAN 66, and the information is obtained via the CAN 66. At S22, it is determined based on the obtained information whether the steering system is in the backup power-supply situation.

When it is determined that the steering system is not in the backup power-supply situation, namely, when it is determined that the steering system is in the normal power-supply situation, the control flow proceeds to S23 at which the central controller 68 instructs the steering ECU 62a constituting the control main system to execute the basic steering process and instructs the steering ECU 62b constituting the control sub system to execute the dependent steering process, so as to execute the coordinated steering control.

When it is determined that the steering system is in the backup power-supply situation, the control flow proceeds to S24 to obtain information on the voltage in the power supply from the main power source 70 to the steering sub system 14b. Though not described in detail, the steering ECU 62b includes a voltage sensor for detecting a voltage received by itself. The central ECU 68 receives the information from the steering ECU 62b via the CAN 66. Based on the information, it is determined at S25 whether the power supply to the steering sub system 14b can be conducted by the main power source 70 at an appropriate voltage, namely, it is determined whether the steering system is in the power-supply disabled situation of the sub system. When the steering system in the power-supply disabled situation of the sub system, the control flow proceeds to S26 at which the central controller 68 instructs the steering ECU 62a constituting the control main system to execute the current-limited steering process and instructs the steering ECU 62b constituting the control sub system not to operate the steering sub system 14b.

On the other hand, when it is determined at S25 that the power supply to the steering main system 14b can be conducted by the main power source 70 at an appropriate voltage, the control flow proceeds to S27 at which it is determined whether an operation mode flag FM is "1". The operation mode flag FM indicates which one of the limit operation mode, the non-operation mode, and the switch mode is employed. The operation mode flag FM is set to "1" when the non-operation mode is employed, to "2" when the limit operation mode is employed, and to "3" when the switch mode is employed.

When the operation mode flag FM is "1", it is recognized that the non-operation mode is employed, and the control flow proceeds to S28 at which the central controller 68 instructs the steering ECU 62a constituting the control main system not to operate the steering main system 14a and instructs the steering ECU 62b constituting the control sub system to execute the basic steering process. When it is determined at S27 that the operation mode flag FM is not "1", the control flow proceeds to S29 to determine whether the operation mode flag FM is "2". When the operation mode flag FM is "2", it is recognized that the limit operation mode is employed, and the control flow proceeds to S30 at which the central controller 68 instructs the steering ECU 62a constituting the control main system to execute the current-limited steering process and instructs the steering ECU 62b constituting the control sub system to execute the basic steering process.

When it is determined at S29 that the operation mode flag FM is not "2", namely, when the operation mode flag FM is "3", it is recognized that the switch mode is employed, and the control flow proceeds to S31 to obtain the motor rotational speed N of the steering motor 50. Though not described in detail, any of the steering main system 14a and the steering sub system 14b being currently operated is identifying the rotational speed N based on the motor rotation angle ν detected by the motor rotation angle sensor 54. Thus, information on the identified rotational speed N is transmitted from any of the steering main system 14a and the steering sub system 14b being currently operated.

It is subsequently determined at S32 whether the rotational speed N is higher than $N_2'$ indicated above. When the rotational speed N is higher than $N_2'$, it is recognized that the steering motor 50a will operate in the regenerative region by the current-limited steering process. In this case, the control flow proceeds to S28 at which the central controller 68 instructs the steering ECU 62a constituting the control main system not to operate the steering main system 14a and instructs the steering ECU 62b constituting the control sub system to execute the basic steering process, so as to operate the steering device 14 in the non-operation mode. On the other hand, when it is determined that the rotational speed N is not higher than $N_2'$, the control flow proceeds to S30 at which the central controller 68 instructs the steering ECU 62a constituting the control main system to execute the current-limited steering process and instructs the steering ECU 62b constituting the control sub system to execute the basic steering process, so as to operate the steering device 14 in the limit operation mode.

(b) Reaction Force Control

The reaction force control is for giving, to the driver, an operation feeling with respect to the steering operation. The present steering system is configured such that, in the normal power-supply situation, the operation main system 12a and the operation sub system 12b apply the same operation reaction force $F_{CT}$ to the steering wheel 20 independently of and in parallel to each other. There will be hereinafter described a reaction force application process executed in the reaction force control by each of the operation ECU 60a constituting the control main system and the operation ECU 60b constituting the control sub system. Since the reaction force application process executed by the operation ECU 60a and the reaction force application process executed by the operation ECU 60b are substantially identical to each other, the following description will be made focusing on one reaction force application process.

The operation ECU 60 determines the operation reaction force $F_{CT}$ based on two components, i.e., a steering-load-dependent component $F_S$ and an operation-force-dependent reduction component $F_A$, according to the following expression:

$$F_{CT}=F_S-F_A$$

The steering-load-dependent component $F_S$ is a component relating to the steering force (the steering torque $Tq_S$ of the steering motor 50) necessary for steering the wheels 10. The steering-load-dependent component $F_S$ is determined based on the steering current $I_S$ being supplied to the steering motor 50. Though not described in detail, it is recognized that the steering load of the wheels 10 increases with an increase in the steering current $I_S$, and the steering-load-dependent component $F_S$ is determined to be a great value. In this respect, the information relating to the steering current $I_S$ being actually supplied to the steering motor 50 is transmitted from the steering ECU 62 to the operation ECU 60 in the same system via the dedicated communication line 64.

The operation-force-dependent reduction component $F_A$ may be considered as a component for giving, to the driver, an operation feeling in what is called power steering system. In the power steering system, an assist torque corresponding to the operation torque $Tq_O$ is applied to the steering shaft 22. The operation-force-dependent reduction component $F_A$ is determined according to the following expression so as to simulate the assist torque:

$$F_A=\beta \times Tq_O$$

In the above expression, "β" is a gain for determining the operation-force-dependent reduction component $F_A$. The operation ECU 60 detects the operation torque $Tq_O$ via the operation torque sensor 36.

Based on the thus determined operation reaction force $F_{CT}$, the operation ECU 60 determines a reaction force current $I_C$ to be supplied to the reaction force motor 26 according to the following expression and supplies the determined reaction force current $I_C$ to the reaction force motor 26:

$$I_C=\alpha \times F_{CT}$$

In the above expression, "α" is a current determining coefficient set in advance.

Figure 7:
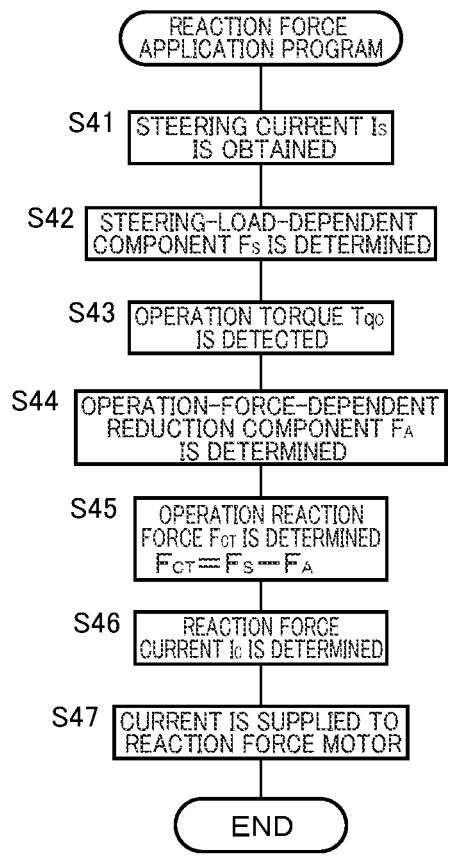
FIG. 7 is a flowchart of a reaction force application program executed in the steering system according to the embodiment.

The computer of each of the operation ECU 60a and the operation ECU 60b repeatedly executes a reaction force application program represented by a flowchart of FIG. 7 at a short time pitch of from several to several tens of milliseconds, for instance, so that the reaction force application process is executed. The process according to the program will be hereinafter briefly described. At S41, the steering current $I_S$ is obtained. At S42, the steering-load-dependent component $F_S$ is determined based on the steering current $I_S$. At S43, the operation torque $Tq_O$ is detected. At S44, the operation-force-dependent reduction component $F_A$ is determined based on the operation torque $Tq_O$. At S45, the operation reaction force $F_{CT}$ is determined based on the steering-load-dependent component $F_S$ and the operation-force-dependent reduction component $F_A$. At S46, the reaction force current $I_C$ to be supplied to the reaction force motor 26 is determined based on the operation reaction force $F_{CT}$. At S47, the current is supplied to the reaction force motor 26 based on the determined reaction force current $I_C$.

The reaction force control executed in the backup power-supply situation will be briefly explained. The electric power is supplied to the operation main system 12a only from the backup power source 72. As long as the voltage in a power supply to the operation sub system 12b is appropriate, the reaction force application process is executed only for the operation sub system 12b. When the voltage in the power supply to the operation sub system 12b is not appropriate, the reaction force application process is executed only for the operation main system 12a.

What is claimed is:

1. A steer-by-wire steering system, comprising:
a main power source and a backup power source;
a steering device including a dual-system steering motor including a main system and a sub system and configured to steer a wheel by a force generated by the steering motor; and
a controller configured to control the main system and the sub system of the steering motor so as to control the steering device based on a steering request,
wherein a power supply to the main system of the steering motor is conducted selectively by the main power source and the backup power source, and a power supply to the sub system of the steering motor is conducted by only the main power source,
wherein, in a normal power-supply situation in which the power supply to the main system of the steering motor and the power supply to the sub system of the steering motor are conducted by the main power source, the controller controls the sub system of the steering motor to operate in accordance with the main system of the steering motor, and
wherein, in a backup power-supply situation in which the power supply to the main system of the steering motor is conducted by the backup power source, the controller controls the main system of the steering motor not to operate or to operate while limiting the power supply to the main system and the controller controls the sub system of the steering motor independently of the main system.

2. The steer-by-wire steering system according to claim 1, wherein, in the normal power-supply situation, the controller controls the main system and the sub system of the steering motor such that the main system and the sub system generate mutually the same force.

3. The steer-by-wire steering system according to claim 1, wherein, when the power supply to the sub system of the steering motor is not appropriately conducted by the main power source in the backup power-supply situation, the controller controls the sub system of the steering motor not to operate and controls the main system of the steering motor to operate while limiting the power supply to the main system.

4. The steer-by-wire steering system according to claim 3, wherein, also when the power supply to the sub system of the steering motor is appropriately conducted by the main power source in the backup power-supply situation, the controller controls the main system of the steering motor to operate while limiting the power supply to the main system.

5. The steer-by-wire steering system according to claim 3, wherein, when the power supply to the sub system of the steering motor is appropriately conducted by the main power source in the backup power-supply situation, the controller controls the main system of the steering motor not to operate.

6. The steer-by-wire steering system according to claim 1, wherein the controller includes two systems including a main system and a sub system so as to correspond to the main system and the sub system of the steering motor,
wherein, in the normal power-supply situation, the sub system of the controller controls the power supply to the sub system of the steering motor by the main power source based on a supply current to the main system of the steering motor determined by the main system of the controller, and
wherein, in the backup power-supply situation, the sub system of the controller determines a supply current to the sub system of the steering motor and controls the power supply to the sub system of the steering motor by the main power source based on the determined supply current without depending on the supply current to the main system of the steering motor determined by the main system of the controller.

7. The steer-by-wire steering system according to claim 1, wherein the main power source includes a storage battery, and the backup power source is a capacitor.

8. The steer-by-wire steering system according to claim 1, wherein, in the normal power-supply situation, the backup power source is charged with electric energy received from the main power source, and
wherein, in the backup power-supply situation, the power supply to the main system of the steering motor by the backup power source is conducted in dependence on the charged electric energy.

9. A steer-by-wire steering system, comprising:
a main power source and a backup power source;
a steering device including a steering motor and configured to steer a wheel by a force generated by the steering motor; and
a controller configured to control a main system and a sub-system of the steering motor so as to control the steering device based on a steering request,
wherein a power supply to the main system of the steering motor is conducted selectively by the main power source and the backup power source, and a power supply to the sub system of the steering motor is conducted by only the main power source, and
wherein the controller limits a current to be supplied to the steering motor when a power supply to the steering motor by the main power source is switched to a power supply to the steering motor by the backup power source.

* * * * *